US012646141B2

(12) United States Patent
Lee et al.

(10) Patent No.: US 12,646,141 B2
(45) Date of Patent: Jun. 2, 2026

(54) IMAGE PROCESSING APPARATUS AND IMAGE PROCESSING METHOD THEREOF

(71) Applicant: SAMSUNG ELECTRONICS CO., LTD., Suwon-si (KR)

(72) Inventors: Cheon Lee, Suwon-si (KR); Donghyun Kim, Suwon-si (KR); Yongsup Park, Suwon-si (KR); Jaeyeon Park, Suwon-si (KR); Iljun Ahn, Suwon-si (KR); Hyunseung Lee, Suwon-si (KR); Taegyoung Ahn, Suwon-si (KR); Youngsu Moon, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 124 days.

(21) Appl. No.: 18/506,755

(22) Filed: Nov. 10, 2023

(65) Prior Publication Data

US 2024/0078631 A1 Mar. 7, 2024

Related U.S. Application Data

(63) Continuation of application No. 17/527,732, filed on Nov. 16, 2021, now Pat. No. 11,836,890, which is a (Continued)

(30) Foreign Application Priority Data

May 22, 2019 (KR) ........................ 10-2019-0060240
Jul. 3, 2019 (KR) ........................ 10-2019-0080346

(51) Int. Cl.
G06T 3/403 (2024.01)
G06T 3/4053 (2024.01)
(Continued)

(52) U.S. Cl.
CPC ........... *G06T 3/403* (2013.01); *G06T 3/4053* (2013.01); *G06T 7/13* (2017.01); *G06V 10/82* (2022.01); *G06T 2207/20081* (2013.01)

(58) Field of Classification Search
None
See application file for complete search history.

(56) References Cited

U.S. PATENT DOCUMENTS 6,233,365 B1 * 5/2001 Teruhiko ................. G06T 3/403
382/156
8,498,450 B2 7/2013 Nakanishi
(Continued)

FOREIGN PATENT DOCUMENTS

CN 102750695 B 4/2015
CN 108596841 A 9/2018
(Continued)

OTHER PUBLICATIONS

Communication issued on Nov. 25, 2024 by the China National Intellectual Property Administration in Chinese Patent Application No. 202010080412.6.
(Continued)

*Primary Examiner* — Jiangeng Sun

(74) *Attorney, Agent, or Firm* — Sughrue Mion, PLLC

(57) ABSTRACT

An image processing apparatus applies an image to a first learning network model to optimize the edges of the image, applies the image to a second learning network model to optimize the texture of the image, and applies a first weight
(Continued)

to the first image and a second weight to the second image based on information on the edge areas and the texture areas of the image to acquire an output image.

20 Claims, 13 Drawing Sheets

Related U.S. Application Data continuation of application No. 16/838,650, filed on Apr. 2, 2020, now Pat. No. 11,295,412.

(51) Int. Cl.
    *G06T 7/13*        (2017.01)
    *G06V 10/82*       (2022.01)

(56)                 References Cited

U.S. PATENT DOCUMENTS

| | | | |
|---|---|---|---|
| 9,280,804 | B2 | 3/2016 | Krishnaswamy et al. |
| 10,007,972 | B2 | 6/2018 | Choi et al. |
| 10,165,204 | B2 | 12/2018 | Zhou et al. |
| 10,181,092 | B2 | 1/2019 | Shao et al. |
| 10,489,887 | B2 | 11/2019 | El-Khamy et al. |
| 10,650,283 | B2 | 5/2020 | Lee et al. |
| 10,929,749 | B2 | 2/2021 | Srinivasa et al. |
| 10,970,820 | B2 | 4/2021 | El-Khamy et al. |
| 11,403,838 | B2 * | 8/2022 | Zhu .......................... G06T 1/20 |
| 2003/0143634 | A1 * | 7/2003 | Terry ................. G01N 33/5041 |
| | | | 435/325 |
| 2004/0184657 | A1 * | 9/2004 | Lin ....................... G06T 3/4007 |
| | | | 382/159 |
| 2018/0068463 | A1 * | 3/2018 | Risser ...................... G06T 7/45 |
| 2018/0075581 | A1 * | 3/2018 | Shi ......................... G06N 3/045 |
| 2018/0158240 | A1 * | 6/2018 | Saito .................... G06V 40/164 |
| 2018/0293707 | A1 | 10/2018 | El-Khamy et al. |
| 2018/0307983 | A1 | 10/2018 | Srinivasa et al. |
| 2019/0188539 | A1 | 6/2019 | Lee et al. |
| 2019/0378242 | A1 * | 12/2019 | Zhang ..................... G06F 18/22 |
| 2020/0090305 | A1 | 3/2020 | El-Khamy et al. |
| 2020/0211413 | A1 * | 7/2020 | Zhang .................. A63H 33/042 |
| 2020/0320769 | A1 * | 10/2020 | Chen ..................... G06F 18/214 |
| 2021/0224953 | A1 | 7/2021 | El-Khamy et al. |
| 2021/0279571 | A1 | 9/2021 | Srinivasa et al. |
| 2021/0303243 | A1 * | 9/2021 | Li ......................... G06F 3/1208 |
| 2023/0066219 | A1 * | 3/2023 | Yu ........................... G06F 30/27 |

FOREIGN PATENT DOCUMENTS

| | | |
|---|---|---|
| CN | 108734645 A | 11/2018 |
| CN | 109345485 A | 2/2019 |
| CN | 109934247 A | 6/2019 |
| EP | 3 499 416 A1 | 6/2019 |
| JP | 2009-296328 A | 12/2009 |
| KR | 10-1040461 B1 | 6/2011 |
| KR | 10-1795271 B1 | 11/2017 |
| KR | 10-1882704 B1 | 7/2018 |
| KR | 10-2018-0097342 A | 8/2018 |
| KR | 10-2018-0114488 A | 10/2018 |
| KR | 10-2019-0006741 A | 1/2019 |
| TW | 201837854 A | 10/2018 |

OTHER PUBLICATIONS

Chao Dong et al., "Accelerating the Super-Resolution Convolutional Neural Network", arXiv:1608.00367v1, Aug. 1, 2016, pp. 1-17, 19 pages total.

Communication dated Aug. 27, 2021, from the Intellectual Property Office of Taiwan in Application No. 109112722.

Communication dated Aug. 30, 2021, issued by the Korean Intellectual Property Office in Korean Application No. 10-2019-0080346.

Communication dated Sep. 8, 2020 issued by the European Intellectual Property Office in counterpart European Application No. 20165972.9.

Communication issued Apr. 20, 2022 by the European Patent Office in counterpart European Patent Application No. 20165972.9.

Communication issued Mar. 21, 2023 by the Korean Intellectual Property Office in counterpart Korean Patent Application No. 10-2022-0072692.

International Search Report (PCT/ISA/210) dated Aug. 14, 2020 issued by the International Searching Authority in counterpart International Application No. PCT/KR2020/006355.

International Written Opinion (PCT/ISA/237) dated Aug. 14, 2020 issued by the International Searching Authority in counterpart International Application No. PCT/KR2020/006355.

Kenji Suzuki et al., "Neural Edge Enhancer for Supervised Edge Enhancement from Noisy Images", IEEE Transactions on Pattern Analysis and Machine Intelligence, vol. 25, No. 12, IEEE Computer Society, ISSN: 0162-8828, DOI: 10.1109/TPAMI.2003.1251151, Dec. 2003, pp. 1582-1596, 15 pages total, XP011103926.

Peng Ren et al., "Clustering-oriented Multiple Convolutional Neural Networks for Single Image Super-resolution", ORE, Oct. 24, 2017, pp. 1-13 (14 pages total).

Sumei Li et al., "A two-channel convolutional neural network for image super-resolution", Neurocomputing, vol. 275, No. 31, Jan. 31, 2018, pp. 267-277, 13 pages total.

Yang Zhao et al., "High Resolution Local Structure-Constrained Image Upsampling", IEEE Transactions on Image Processing, vol. 24, No. 11, ISSN: 1057-7149, DOI: 10.1109/TIP.2015.2456416, Nov. 2015, pp. 4394-4407, 14 pages total, XP011666981.

Kwanyoung Kim et al., "SREdgeNET: Edge Enhanced Single Image Super Resolution using Dense Edge Detection Network and Feature Merge Network", arxiv.org, Cornell University Library, Dec. 18, 2018, 10 pages total, XP080994093.

Peng Ren eta al., "Clustering-Oriented Multiple Convolutional Neural Networks for Single Image Super-Resolution", Cognitive Computation, vol. 10, No. 1, ISSN: 1866-9956, DOI: 10. 1007/S12559-017-9512-2, Oct. 4, 2017, pp. 165-178, 14 pages total, XP036440651.

Communication issued on Jun. 28, 2024 by the China National Intellectual Property Administration for Chinese Patent Application No. 202010080412.6.

Communication dated Feb. 10, 2025, issued by the Chinese National Intellectual Property Administration in Chinese Patent Application No. 202010080412.6.

* cited by examiner

100

110

120

100'

IMAGE PROCESSING APPARATUS AND IMAGE PROCESSING METHOD THEREOF

CROSS-REFERENCE TO RELATED APPLICATION(S)

This application is a continuation of U.S. application Ser. No. 17/527,732 filed Nov. 16, 2021, which is a continuation of U.S. patent application Ser. No. 16/838,650, filed on Apr. 2, 2020, which is based on and claims priority under 35 U.S.C. § 119(a) from Korean Patent Application No. 10-2019-0060240, filed on May 22, 2019, in the Korean Intellectual Property Office and Korean Patent Application No 10-2019-0080346, filed on Jul. 3, 2019, in the Korean Intellectual Property Office, the disclosures of which are herein incorporated by reference in their entireties.

BACKGROUND

1. Field

The disclosure relates to an image processing apparatus and an image processing method thereof, and more particularly, to an image processing apparatus that reinforces a characteristic of an image by using a learning network model, and an image processing method thereof.

2. Description of Related Art

Spurred by the development of electronic technologies, various types of electronic apparatuses have been developed and distributed. In particular, image processing apparatuses have been deployed in various places such as homes, offices, and public spaces and are being continuously developed in recent years.

Recently, high resolution display panels, such as a 4K UHD TV, were launched and have been widely distributed. However, the availability of high resolution content for reproduction on such high resolution display panels is somewhat limited. Accordingly, various technologies for generating high resolution content from low resolution content are being developed. In particular, demand for efficiently processing of a large amount of operations necessary to generate high resolution content within limited processing resources is increasing.

Also, recently, artificial intelligence systems replicating human level intelligence have been used in various fields. An artificial intelligence system refers to a system in which a machine learns, determines, and performs processing by itself, unlike conventional rule-based smart systems. An artificial intelligence system shows a more improved recognition rate as the system iteratively operates, and for example becomes capable of understanding user preference more correctly. Accordingly, conventional rule-based smart systems are gradually being replaced by deep learning-based artificial intelligence systems.

An artificial intelligence technology consists of machine learning (for example, deep learning) and element technologies utilizing machine learning.

Machine learning refers to an algorithm technology of classifying/learning the characteristics of input data by itself. Meanwhile, an element technology refers to a technology of simulating functions of a human brain such as cognition and determination by using a machine learning algorithm such as deep learning, and includes fields of technologies such as linguistic understanding, visual understanding, inference/prediction, knowledge representation, and operation control.

There have been attempts to reinforce a characteristic of an image by using artificial intelligence technologies at conventional image processing apparatuses. However, there were problems that, with the performances of conventional image processing apparatuses, there was a limit on processing amounts of operations required to generate a high resolution image, and a lot of time was taken. Accordingly, there was a demand for a technology enabling an image processing apparatus to generate a high resolution image by executing only a small amount of operations, and provide the image.

SUMMARY

The disclosure is to address the aforementioned needs, and provides an image processing apparatus acquiring a high resolution having an improved image characteristic by using a plurality of learning network models, and an image processing method thereof.

An image processing method according to an embodiment of the disclosure for achieving the aforementioned purpose includes a memory storing computer-readable instructions and a processor configured to execute the computer-readable instructions to, apply an input image as a first input to a first learning network model acquire a first image comprising enhanced edges that are optimized based on edges of the input image from the first learning network model, and apply the input image as a second input to a second learning network model and acquire a second image comprising an enhanced texture that is optimized based on texture of the input image from the second learning network model. The processor identifies edge areas and texture areas included in the image, and applies a first weight to the first image and a second weight to the second image based on information on the edge areas and the texture areas and acquires an output image that is optimized from the input image based on the first weight applied to the first image and the second weight applied to the second image.

Also, a first type of the first learning network model is different from a second type of the second learning network model.

In addition, the first learning network model may be one of a deep learning model for optimizing the edges of the input image by using a plurality of layers or a machine learning model trained to optimize the edges of the input image by using a plurality of pre-learned filters.

Also, the second learning network model may be one of a deep learning model for optimizing the texture of the input image by using a plurality of layers or a machine learning model to optimize the texture of the input image by using a plurality of pre-learned filters.

Meanwhile, the processor may acquire the first weight corresponding to the edge areas and the second weight corresponding to the texture areas based on proportion information of the edge areas and the texture areas.

Also, the processor may downscale the input image to acquire a downscaled image having a resolution less than a resolution of the input image. In addition, the first learning network model may acquire the first image having the enhanced edges from the first learning network model that upscales the downscaled image, and the second learning network model may acquire the second image having the enhanced texture from the second learning network model that upscales the downscaled image.

Further, the processor may acquire area detection information by which the edge areas and the texture areas have been identified based on the downscaled image, and provide the area detection information and the image respectively to the first and second learning network models.

In addition, the first learning network model may acquire the first image by upscaling the edge areas, and the second learning network model may acquire the second image by upscaling the texture areas.

Also, the first image and the second image may respectively be a first residual image and a second residual image. In addition, the processor may apply the first weight to the first residual image based on the edge areas, and apply the second weight to the second residual image based on the texture areas, and then mix the first residual image, the second residual image, and the input image to acquire the output image.

Meanwhile, the second learning network model may be a model that stores a plurality of filters corresponding to each of a plurality of image patterns, and classifies each of image blocks included in the image into one of the plurality of image patterns, and applies at least one filter corresponding to classified image patterns among the plurality of filters to the image blocks and provides the second image.

Here, the processor may accumulate index information of image patterns corresponding to each of the image blocks classified and identify the image as one of a nature image or a graphic image based on the index information, and adjust the first weight and the second weight based on a result of identifying the input image as one of the nature image or the graphic image.

Here, the processor may, based on the input image being identified as the nature image, increase at least one of the first weight or the second weight, and based on the input image being identified as the graphic image, decrease at least one of the first weight or the second weight.

Meanwhile, an image processing method of an image processing apparatus according to an embodiment of the disclosure includes the steps of applying an input image as a first input to a first learning network model, acquiring a first image comprising enhanced edges that are optimized based on edges of the input image from the first learning network model, applying the input image as second input to a second learning network model, acquiring a second image comprising an enhanced texture that is optimized based on texture of the input image from the second learning network model, identifying edge areas of the edges included in the input image, identifying texture areas included in the input image, applying a first weight to the first image based on the edge areas, applying a second weight to the second image based on the texture areas, and acquiring an output image that is optimized from the input image based on the first weight applied to the first image and the second weight applied to the second image.

Here, the first learning network model and the second learning network model may be learning network models of different types from each other.

Also, the first learning network model may be one of a deep learning model for optimizing the edges of the input image by using a plurality of layers or a machine learning model trained to optimize the edges of the input image by using a plurality of pre-learned filters.

In addition, the second learning network model may be one of a deep learning model for optimizing the texture of the input image by using a plurality of layers or a machine learning model trained to optimize the texture of the input image by using a plurality of pre-learned filters.

Also, the step of acquiring the first weight and the second weight based on proportion information of the edge areas in the input image and the texture areas in the input image.

In addition, the image processing method may include the step of down downscaling the input image to acquire a downscaled image having a resolution less than a resolution of the input image. Meanwhile, the first learning network model may acquire the first image by upscaling the downscaled image, and the second learning network model may acquire the second image by upscaling the downscaled image.

Here, the image processing method may include the steps of acquiring first area detection information that identifies the edge areas of the input image and second area detection information that identifies the texture areas of the input image, and providing the area detection information and the image respectively to the first and second learning network models.

Meanwhile, the first learning network model may acquire the first image by upscaling the edge areas, and the second learning network model may acquire the second image by upscaling the texture areas.

Also, the first image and the second image may respectively be a first residual image and a second residual image.

According to the various embodiments of the disclosure as described above, an image of a high resolution is generated by applying learning network models different from each other to an image, and the amount of operations required to generate the image of a high resolution is decreased, and thus an image of a high resolution can be generated within limited resources of an image processing apparatus, and the image can be provided to a user.

DETAILED DESCRIPTION

Figure 1:
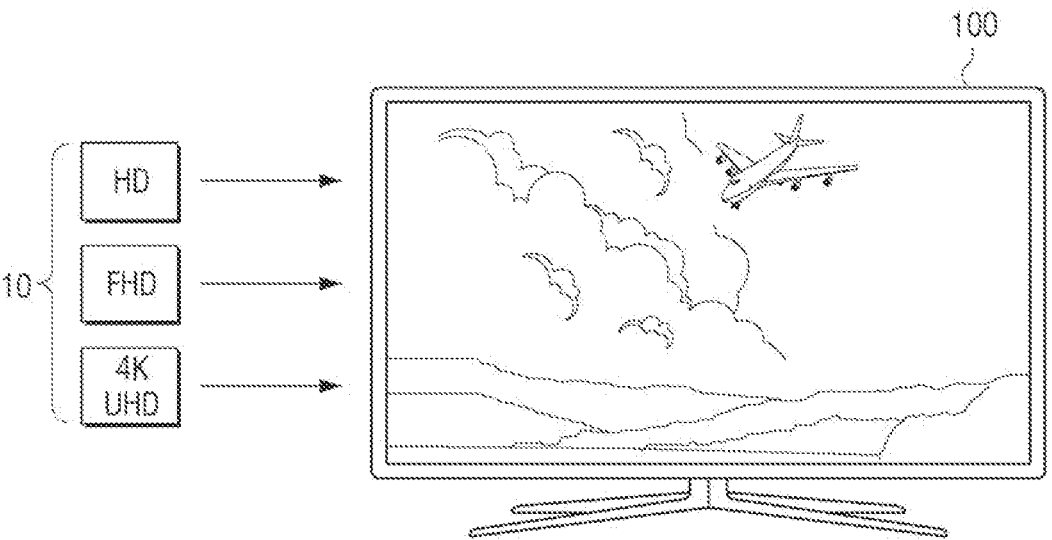
FIG. 1 is a diagram illustrating an implementation example of an image processing apparatus according to an embodiment of the disclosure.

Hereinafter, the disclosure will be described in detail with reference to the accompanying drawings.

As terms used in the embodiments of the disclosure, general terms that are conventionally used widely were selected as far as possible, in consideration of the functions described in the disclosure. However, the terms may vary depending on the intention of those skilled in the art in the pertinent field, or emergence of new technologies. Also, in particular cases, there may be terms that are designated, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

In this specification, expressions such as "have," "may have," "include" and "may include" should be construed as denoting that there exist such characteristics (e.g.: elements such as numerical values, functions, operations and components), and the terms are not intended to exclude the existence of additional characteristics.

Also, the expression "at least one of A and/or B" should be interpreted to mean any one of "A" or "B" or "A and B."

In addition, the expressions "first," "second" and the like used in this specification may be used to describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to mean that the one element is directly coupled to the another element, or the one element is coupled to the another element through still another element (e.g.: a third element).

Singular expressions include plural expressions, unless defined obviously differently in the context. Further, in the disclosure, terms such as "include" and "have" should be construed as designating that there are such characteristics, numbers, steps, operations, elements, components or a combination thereof described in the specification, but not to exclude in advance the existence or possibility of adding one or more of other characteristics, numbers, steps, operations, elements, components or a combination thereof.

Also, in the disclosure, "a module" or "a unit" may perform at least one function or operation, and may be implemented as hardware or software, or as a combination of hardware and software. Further, a plurality of "modules" or "units" may be integrated into at least one module and implemented as at least one processor, excluding "a module" or "a unit" that needs to be implemented as specific hardware.

In addition, in this specification, the term "user" may refer to a person who operates an electronic apparatus or an apparatus (e.g.: an artificial intelligence electronic apparatus).

Hereinafter, embodiments of the disclosure will be described in more detail with reference to the accompanying drawings.

FIG. 1 is a diagram illustrating an implementation example of an image processing apparatus according to an embodiment of the disclosure.

The image processing apparatus 100 may be implemented as a television (TV) as illustrated in FIG. 1. However, the image processing apparatus 100 is not limited thereto, and the image processing apparatus 100 may be implemented as any of apparatuses equipped with an image processing function and/or a display function such as a smartphone, a tablet PC, a laptop PC, a head mounted display (HMD), a near eye display (NED), a large format display (LFD), a digital signage, a digital information display (DID), a video wall, a projector display, a camera, a camcorder, a printer, etc. without limitation.

The image processing apparatus 100 may receive images of various resolutions or various compressed images. For example, the image processing apparatus 100 may receive an image 10 formatted according to any of standard definition (SD), high definition (HD), full HD, and ultra HD images. Also, the image processing apparatus 100 may receive an image 10 in an encoded format or a compressed format such as MPEG (e.g., MP2, MP4, MP7, etc.), AVC, H.264, HEVC, etc.

Even if the image processing apparatus 100 is implemented as a UHD TV according to an embodiment of the disclosure, due to limited availability of UHD content, there are many instances in which images such as standard definition (SD), high definition (HD) and full HD images (hereinafter, referred to as images of a low resolution) are only available. In this case, a method of enlarging an input image of a low resolution to a UHD image (hereinafter, referred to as an image of a high resolution) and providing the resulting image may be provided. As an example, an image of a low resolution may be applied as input to a learning network model such that the image of a low resolution may be enlarged, and an image of a high resolution may thereby be acquired as output for display on the image processing apparatus 100.

However, in order to enlarge an image of a low resolution to an image of a high resolution, a large number of complex processing operations are generally required to transform the image data. Accordingly, an image processing apparatus 100 with high performance and high complexity is required to execute such transformation. As an example, for upscaling a 60P image in an SD level of a resolution of 820×480 to an image of a high resolution, the image processing apparatus 100 should perform operations for 820×480×60 pixels per second. Thus, a processing unit such as a central processing unit (CPU) or a graphics processing unit (GPU) or combinations thereof with high performance are required. As another example, the image processing apparatus 100 should perform operations for 3840×2160×60 pixels per second to upscale a 60P image in a UHD level of a resolution of 4K to an image of a resolution of 8K. Thus, a processing unit capable of processing a large number of operations, as much as at least 24 times compared to a case of upscaling an image in an SD level, is required.

Accordingly, hereinafter, various embodiments provide an image processing apparatus 100 that decreases an amount of operations required to upscale an image of a lower resolution to an image of higher resolution, and thereby maximizes limited resources of the image processing apparatus 100 will be described.

Also, various embodiments in which the image processing apparatus 100 acquires an output image while reinforcing or enhancing at least one image characteristic among various characteristics of an input image will be described.

Figure 2:
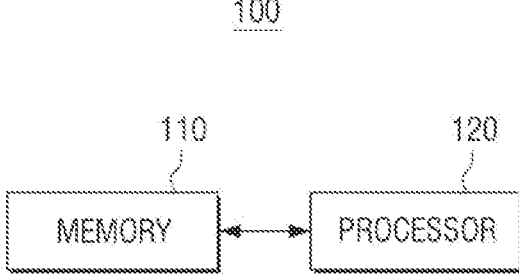
FIG. 2 is a block diagram illustrating a configuration of an image processing apparatus according to an embodiment of the disclosure.

FIG. 2 is a block diagram illustrating a configuration of an image processing apparatus according to an embodiment of the disclosure.

According to FIG. 2, the image processing apparatus 100 includes a memory 110 and a processor 120.

The memory 110 is electronically connected with the processor 120, and may store data necessary for executing various embodiments of the disclosure. For example, the memory 110 may be implemented as an internal memory such as a ROM (e.g., an electrically erasable programmable read-only memory (EEPROM)), a RAM, etc. included in the processor 120, or a memory separate from the processor 120.

The memory 110 may be implemented in the form of a memory embedded in the image processing apparatus 100, or in the form of a memory that can be attached on or detached from the image processing apparatus 100, according to the usage of stored data. For example, in the case of data for operating the image processing apparatus 100, the data may be stored in a memory embedded in the image processing apparatus 100, and in the case of data for an extended function of the image processing apparatus 100, the data may be stored in a memory that can be attached on or detached from the image processing apparatus 100. In the case of being implemented as a memory embedded in the image processing apparatus 100, the memory 110 may be at least one of a volatile memory (e.g.: a dynamic RAM (DRAM), a static RAM (SRAM) or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive or a solid state drive (SSD)).

Meanwhile, in the case of being implemented as a memory that can be attached on or detached from the image processing apparatus 100, the memory 110 may be a memory card (e.g., compact flash (CF), secure digital (SD), micro secure digital (Micro-SD), mini secure digital (Mini-SD), extreme digital (xD), multi-media card (MMC), etc.), an external memory that can be connected to a USB port (e.g., a USB memory), etc.

According to an embodiment of the disclosure, the memory 110 may store at least one program for causing instructions to be executed by the processor 120. Here, an instruction may be an instruction for the processor 120 to acquire an output image by applying an image 10 to a learning network.

According to another embodiment of the disclosure, the memory 110 may store learning network models according to various embodiments of the disclosure.

A learning network model according to an embodiment of the disclosure is a determination model trained based on a plurality of images based on an artificial intelligence algorithm, and the learning network may be a model based on a neural network. A trained determination model may be designed to simulate human intelligence and decision making on a computer, and may include a plurality of network nodes having weights, which simulate neurons of a human neural network. Each of the plurality of network nodes may form a connective relation to simulate synaptic activities of neurons that transmit and receive signals through synapses.

Also, a trained determination model may include, for example, a machine learning model, a neural network model, or a deep learning model developed from a neural network model. In a deep learning model, a plurality of network nodes may be located in different depths (or, layers) from one another, and transmit and receive data according to a convolution connective relation.

As an example, a learning network model may be a convolution neural network (CNN) model trained based on images. A CNN is a multi-layered neural network having a special connection structure designed for voice processing, image processing, etc. Meanwhile, a learning network model is not limited to a CNN. For example, a learning network model may be implemented as at least one deep neural network (DNN) model among a recurrent neural network (RNN) model, a long short term memory network (LSTM) model, a gated recurrent units (GRU) model, or a generative adversarial networks (GAN) model.

For example, a learning network model may restore or convert an image of a low resolution to an image of a high resolution based on a Super-resolution GAN (SRGAN). Meanwhile, the memory 110 according to an embodiment of the disclosure may store a plurality of learning network models of the same kind or different kinds. The number and types of learning network models are not restricted. However, according to another embodiment of the disclosure, at least one learning network model according to various embodiments of the disclosure can be stored in at least one of an external apparatus or an external server.

The processor 120 is electronically connected with the memory 110, and controls the overall operations of the image processing apparatus 100.

According to an embodiment of the disclosure, the processor 120 may be implemented as a digital signal processor (DSP) processing digital signals, a microprocessor, an artificial intelligence (AI) processor, and a timing controller (T-CON). However, the processor 120 is not limited thereto, and the processor 120 may include one or more of a central processing unit (CPU), a micro controller unit (MCU), a micro processing unit (MPU), a controller, an application processor (AP) or a communication processor (CP), and an ARM processor, or may be defined by the terms. Also, the processor 120 may be implemented as a system on chip (SoC) having a processing algorithm stored therein or large scale integration (LSI), or in the form of a field programmable gate array (FPGA).

The processor 120 may apply an image 10 as input to a learning network model and acquire an image having an improved, enhanced, optimized, or reinforced image characteristic. Here, the characteristics of the image 10 may mean at least one of an edge direction, edge strength, texture, a gray value, brightness, contrast, or a gamma value according to a plurality of pixels included in the image 10. For example, the processor 120 may apply an image to a learning network model and acquire an image in which edges and texture have been enhanced. Here, the edge of the image may mean an area in which values of pixels that are spatially adjacent drastically change. For example, the edge may be an area in which brightness of the image drastically changes from a low value to a high value or from a high value to a low value. The texture of the image may be a unique pattern or shape of an area regarded as the same characteristic in the image. Meanwhile, the texture of the image may also consist of fine edges, and thus the processor 120 may acquire an image in which edge components equal to or greater than a first threshold strength (or threshold thickness) and edge components smaller than a second threshold strength (or threshold thickness) have been improved. Here, the first threshold strength may be a value for dividing edge components according to an embodiment of the disclosure, and the second threshold strength may be a value for dividing texture components according to an embodiment of the disclosure, and they may be predetermined values or values set based on the characteristics of the image. However, hereinafter, for the convenience of explanation, characteristics as described above will be referred to as edges and texture.

Meanwhile, the image processing apparatus 100 according to an embodiment of the disclosure may include a plurality of learning network models. Each of the plurality of learning network models may reinforce different characteristics of the image 10. A detailed explanation in this regard will be made with reference to FIG. 3.

Figure 3:
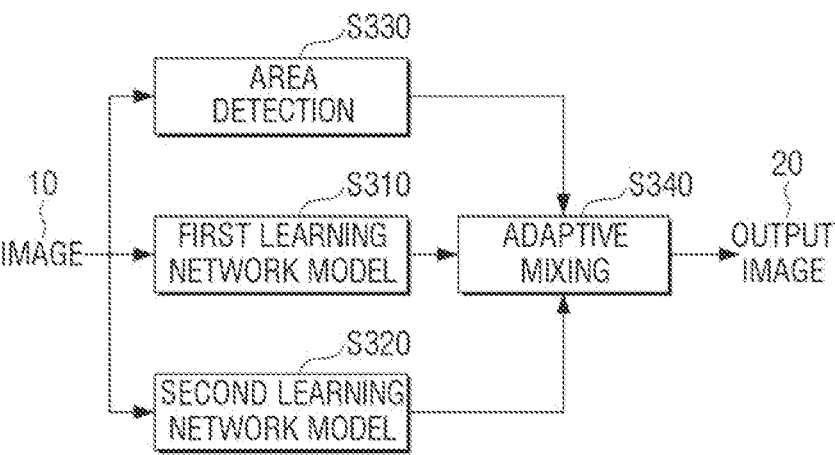
FIG. 3 is a diagram illustrating first and second learning network models according to an embodiment of the disclosure.

FIG. 3 is a diagram for illustrating first and second learning network models according to an embodiment of the disclosure.

Referring to FIG. 3, the processor 120 according to an embodiment of the disclosure may apply the image 10 as input to a first learning network model and acquire as output a first image in which the edge of the image 10 has been improved at operation S310. The image 10 may also be supplied as input to a second learning network model and acquire as output a second image in which the texture of the image 10 has been improved at operation S320.

Meanwhile, the image processing apparatus 100 according to an embodiment of the disclosure may use first and second learning network models based on artificial intelligence algorithms different from each other in parallel. Alternatively, the image 10 may be processed serially by the first learning network model and the second learning network mode. Here, the first learning network model may be a model trained by using bigger resources other than those of the second learning network model. Here, resources may be various data necessary for training and/or processing a learning network model, and may include, for example, whether real time learning is performed, the amount of learning data, the number of convolution layers included in a learning network model, the number of parameters, the capacity of the memory used in a learning network model, the degree that a learning network uses a GPU, and the like.

For example, a GPU provided in the image processing apparatus 100 may include a texture unit, a special function unit (SFU), an arithmetic logic apparatus, etc. Here, the texture unit is a resource for adding material or texture to the image 10, and the special function unit is a resource for processing complex operations such as square roots, reciprocal numbers, and algebraic functions. Meanwhile, an integer arithmetic logic unit (ALU) is a resource processing floating points, integer operations, comparison, and data movements. A geometry unit is a resource calculating the location or viewpoint of an object, the direction of a light source, etc. A raster unit is a resource projecting three-dimensional data on a two-dimensional screen. In this case, a deep learning model may use various resources included in a GPU for learning and operations more than a machine learning model. Meanwhile, resources of the image processing apparatus 100 are not limited to resources of a GPU, and the resources can be resources of various components included in the image processing apparatus 100 such as storage areas of the memory 110, power, etc.

The first learning network model and the second learning network model according to an embodiment of the disclosure may be learning network models of different types.

As an example, the first learning network model may be one of a deep learning based model learning to improve the edge of the image 10 based on a plurality of images or a machine learning model trained to improve the edge of the image by using a plurality of pre-learned filters. The second learning network model may be a deep learning model learning to improve the texture of the image by using a plurality of layers or a machine learning based model trained to improve the texture of the image by using a pre-learned database (DB) and a plurality of pre-learned filters based on a plurality of images. Here, the pre-learned DB may be a plurality of filters corresponding to each of a plurality of image patterns, and the second learning network model may identify an image pattern corresponding to an image block included in the image 10, and optimize the texture of the image 10 by using a filter corresponding to the identified pattern among a plurality of filters. According to an embodiment of the disclosure, the first learning network model may be a deep learning model, and the second learning network model may be a machine learning model.

A machine learning model includes a plurality of pre-learned filters learned in advance based on various information and data input methods such as supervised learning, unsupervised learning, and semi-supervised learning, and identifies a filter to be applied to the image 10 among the plurality of filters.

A deep learning model is a model that performs learning based on a vast amount of data, and includes a plurality of hidden layers between an input layer and an output layer. Thus, a deep learning model may require additional resources of the image processing apparatus 100 greater than those of a machine learning model for performing learning and operations.

As another example, the first and second learning network models may be models that are based on the same artificial intelligence algorithm, but have different sizes or configurations. For example, the second learning network model may be a low complexity model having a smaller size than that of the first learning network model. Here, the size and the complexity of a learning network model may be in a proportional relation with the number of convolution layers and the number of parameters constituting the model. Also, according to an embodiment of the disclosure, the second learning network model may be a deep learning model, and the first learning network model may be a deep learning model using fewer convolution layers than that of the second learning network model.

As still another example, each of the first and second learning network models may be a machine learning model. For example, the second learning network model may be a low complexity machine learning model having a size smaller than that of the first learning network model.

Meanwhile, various embodiments of the disclosure have been explained based on the assumption that the first learning network model is a model trained by using more resources than those of the second learning network model, but this is merely an example, and the disclosure is not limited thereto. For example, the first and second learning network models may be models having the same or similar complexity, and the second learning network model may be a model trained by using greater resources than those of the first learning network model.

The processor 120 according to an embodiment of the disclosure may identify an edge area and a texture area included in the image 10 at operation S330. Then, the processor 120 may apply a first weight to the first image and a second weight to the second image based on information on the edge area and the texture area at operation S340. As an example, the processor 120 may acquire a first weight corresponding to an edge area and a second weight corresponding to a texture area based on information on the proportions of the edge areas and the texture areas included in the image 10. For example, if there are more edge areas than texture areas according to proportions, the processor 120 may apply a greater weight to the first image in which the edge area has been improved than to the second image in which the texture has been improved. As another example, if there are more texture areas than edge areas according to proportions, the processor 120 may apply a greater weight to the second image in which the texture has been improved than to the first image in which the edge has been improved. Then, the processor 120 may acquire an output image 10 based on the first image to which the first weight has been applied and the second image to which the second weight has been applied.

As still another example, the first and second images acquired from the first and second learning network models may be residual images. Here, a residual image may be an image including only residual information other than an original image. As an example, the first learning network model may identify an edge area in the image 10, and optimize the identified edge area and acquire a first image. The second learning network model may identify a texture area in the image 10, and optimize the identified texture area and acquire a second image.

Then, the processor 120 may mix the image 10 with the first image and the second image and acquire an output image 20. Here, mixing may be processing of adding, to the value of each pixel included in the image 10, the corresponding pixel value of each of the first image and the second image. In this case, the output image 20 may be an image having edges and texture have been enhanced, due to the first image and the second image.

The processor 120 according to an embodiment of the disclosure may apply the first and second weights respectively to the first and second images, and then mix the images with the image 10, and thereby acquire an output image 20.

As another example, the processor 120 may divide the image 10 into a plurality of areas. Then, the processor 120 may identify the proportions of edge areas and texture areas of each of the plurality of areas. For the first area in which the proportion of the edge areas is high among the plurality of areas, the processor 120 may set the first weight as a value greater than the second weight. Also, for the second area in which the proportion of the texture areas is high among the plurality of areas, the processor 120 may set the second weight as a value greater than the first weight.

Then, the processor 120 may mix the first and second images to which weights have been applied with the image 10, and acquire an output image at operation S340. The image 10 and the output image 20 corresponding to the image 10 can be expressed as in Formula 1 below.

$$Y_{res}=Y_{img}+a*\text{Network\_Model1}(Y_{img})+$$
$$b*\text{Network\_Model2}(Y_{img}) \qquad \text{[Formula 1]}$$

Here, Y_img means the image 10, Network_Model1 (Y_img) means the first image, Network_Model2(Y_img) means the second image, 'a' means the first weight corresponding to the first image, and 'b' means the second weight corresponding to the second image.

Meanwhile, as still another example, the processor 120 may apply the image 10 as input to a third learning network model and acquire the first weight for applying to the first image and the second weight for applying to the second image. For example, the third learning network model may be trained to identify edge areas and texture areas included in the image 10, and output the first weight reinforcing the edge areas and the second weight reinforcing the texture areas based on the proportions of the identified edge areas and texture areas, the characteristics of the image 10, etc.

Figure 4:
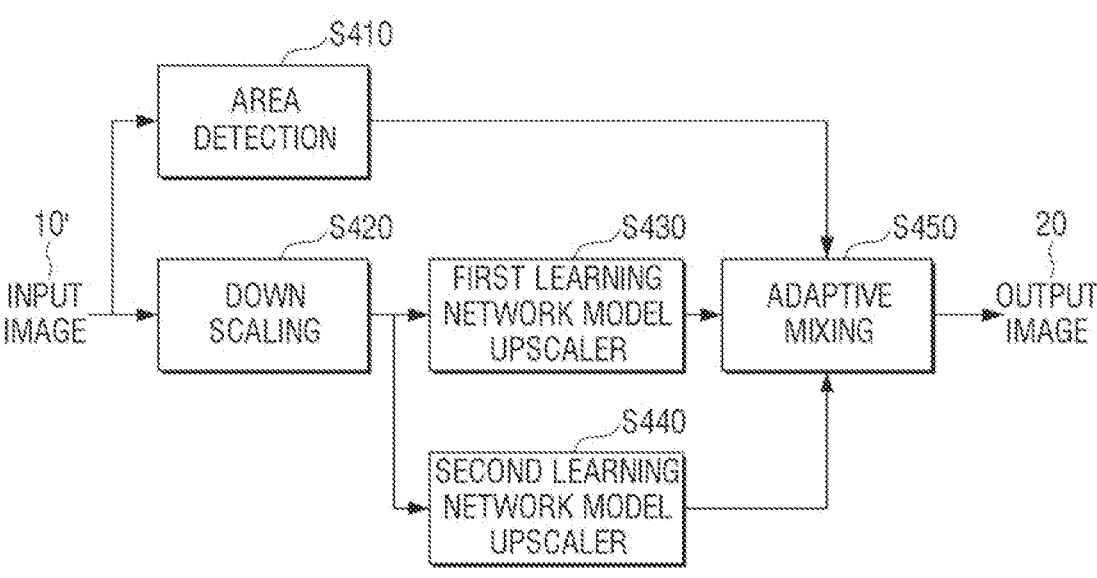
FIG. 4 is a diagram illustrating downscaling according to an embodiment of the disclosure.

FIG. 4 is a diagram for illustrating downscaling according to an embodiment of the disclosure.

Referring to FIG. 4, the processor 120 may identify edge areas and texture areas in the input image 10', and acquire the first weight corresponding to the edge areas and the second weight corresponding to the texture areas at operation S410. As an example, the processor 120 may apply a guided filter to the input image 10', and identify edge areas and texture areas. A guided filter may be a filter used for dividing the image 10 into a base layer and a detail layer. The processor 120 may identify edge areas based on a base layer, and identify texture areas based on a detail layer.

Then, the processor 120 may downscale the input image 10' and acquire an image 10 of a resolution less than that of the input image 10' at operation S420. As an example, the processor 120 may apply sub-sampling to the input image 10' and downscale the resolution of the input image 10' to the target resolution. Here, the target resolution may be a low resolution that is lower than the resolution of the input image 10'. For example, the target resolution may be the resolution of the original image corresponding to the input image 10'. Here, the resolution of the original image may be estimated through a resolution estimation program, or identified based on additional information received together with the input image 10', but the resolution and identification thereof are not limited thereto. Meanwhile, the processor 120 may apply various known downscaling methods other than sub-sampling and thereby acquire an image 10 corresponding to the input image 10'.

As an example, if the input image 10' is a UHD image of a resolution of 4K, for applying the input image 10' as input to the first and second learning network models and acquiring the output image 20, a line buffer memory that is at least 5.33 times (3840/820) larger than the case of applying an SD image of a resolution of 820×480 to the first and second learning network models is required. Also, there is a problem that the space of the memory 110 for storing intermediate operation results of each of a plurality of hidden layers included in the first learning network model, and the required performance of the CPU/GPU according to an increase of the amount of operations required in order for the first learning network model to acquire the first image, increase exponentially.

Accordingly, the processor 120 according to an embodiment of the disclosure may apply a downscaled input image 10 to the first and second learning network models, for reducing the amount of operations required in the first and second learning network models, the storage space of the memory 110, etc.

When the downscaled image 10 is input, the first learning network model according to an embodiment of the disclosure may perform upscaling of enhancing high frequency components corresponding to the edges included in the input image 10 and acquire a first image of a high resolution at operation S430. Meanwhile, the second learning network model may perform upscaling of enhancing high frequency components corresponding to the texture included in the image 10 and acquire a second image of a high resolution at operation S440. Here, the resolutions of the first and second images may be identical to that of the input image 10'. For example, if the input image 10 is an image of 4K resolution, and the downscaled image 10 is an image of 2K resolution, the first and second learning network models may perform upscaling for the image 10 and acquire images of 4K resolution as output therefrom.

The processor 120 according to an embodiment of the disclosure may mix the upscaled first and second images with the input image 10' and acquire an output image 20 of a high resolution in which edges and texture in the input image 10' have been enhanced at operation S450. According to the embodiment illustrated in FIG. 4, the process of acquiring the input image 10' and the output image 20 corresponding to the input image 10' can be expressed as in Formula 2 below.

$$Y_{res} = Y_{org} + a*\text{Network\_Model1}(\text{DownScaling}(Y_{org})) + b*\text{Network\_Model2}(\text{DownScaling}(Y_{org})) \quad \text{[Formula 2]}$$

Here, Y_org means the input image 10', DownScaling (Y_org) means the image 10, Network_Model1(DownScaling(Y_org)) means the first image, Network_Model2 (DownScaling(Y_org)) means the second image, 'a' means the first weight corresponding to the first image, and 'b' means the second weight corresponding to the second image.

Figure 5:
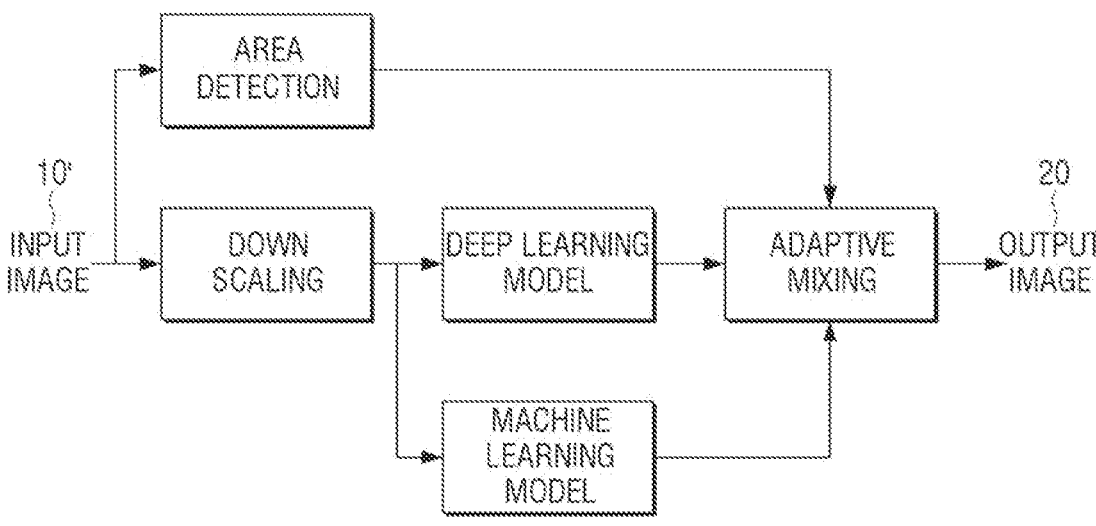
FIG. 5 is a diagram illustrating a deep learning model and a machine learning model according to an embodiment of the disclosure.

FIG. 5 is a diagram illustrating a deep learning model and a machine learning model according to an embodiment of the disclosure.

Referring to FIG. 5, as described above, the first learning network model may be a deep learning model learning to reinforce the edge of the image 10 by using a plurality of layers, and the second learning network model may be a machine learning model trained to reinforce the texture of the image 10 by using a plurality of pre-learned filters.

According to an embodiment of the disclosure, a deep learning model may be modeled in a depth structure including ten or more layers in total in a configuration in which two convolution layers and one pooling layer are repeated. Also, a deep learning model may perform operations by using activation functions of various types such as an Identity Function, a Logistic Sigmoid Function, a Hyperbolic Tangent(tanh) Function, a ReLU Function, a Leaky ReLU Function, and the like. In addition, a deep learning model may adjust a size variously by performing padding, stride, etc. in the process of performing convolution. Here, padding means filling a specific value (e.g., a pixel value) as much as a predetermined size all around a received input value. Stride means a shift interval of a weighting matrix when performing convolution. For example, if stride=3, a learning network model may perform convolution for an input value while shifting a weighting matrix as much as three spaces at once.

According to an embodiment of the disclosure, a deep learning model may learn to optimize one characteristic for which user sensitivity is high among various characteristics of the image 10, and a machine learning model may optimize at least one of the remaining characteristics of the image 10 by using a plurality of pre-learned filters. For example, a case in which there is a close relation between the clarity of an edge area (e.g., an edge direction, edge strength) and the clarity that a user feels regarding the image 10 can be assumed. The image processing apparatus 100 may enhance the edges of the image 10 by using a deep learning model, and as an example of the remaining characteristics, the image processing apparatus 100 may enhance the texture by using a machine learning model. As a deep learning model learns based on a large amount of data greater than a machine learning model, and performs iterative operations, a processing result of a deep learning model is superior to a processing result of a machine learning model is assumed. However, the disclosure is not necessarily limited thereto, and both of the first and second learning network models may be implemented as deep learning based models, or as machine learning based models. As another example, the first learning network model may be implemented as a machine learning based model, and the second learning network model may be implemented as a deep learning based model.

Also, while various embodiments of the disclosure were explained based on the assumption that the first learning network model reinforces edges, and the second learning network model reinforces texture, the specific operations of the learning network models are not limited thereto. For example, a case in which there is the closest relation between the degree of processing the noise of the image 10 and the clarity that a user feels regarding the image 10 can be assumed. In this case, the image processing apparatus 100 may perform image processing on the noise of the image 10 by using a deep learning model, and as an example of the remaining image characteristics, the image processing apparatus 100 may reinforce the texture by using a machine learning model. As another example, if there is the closest relation between the degree of processing the brightness of the image 10 and the clarity that a user feels regarding the image 10, the image processing apparatus 100 may perform image processing on the brightness of the image 10 by using a deep learning model, and as an example of the remaining image characteristics, the image processing apparatus 100 may filter the noise by using a machine learning model.

Figure 6:
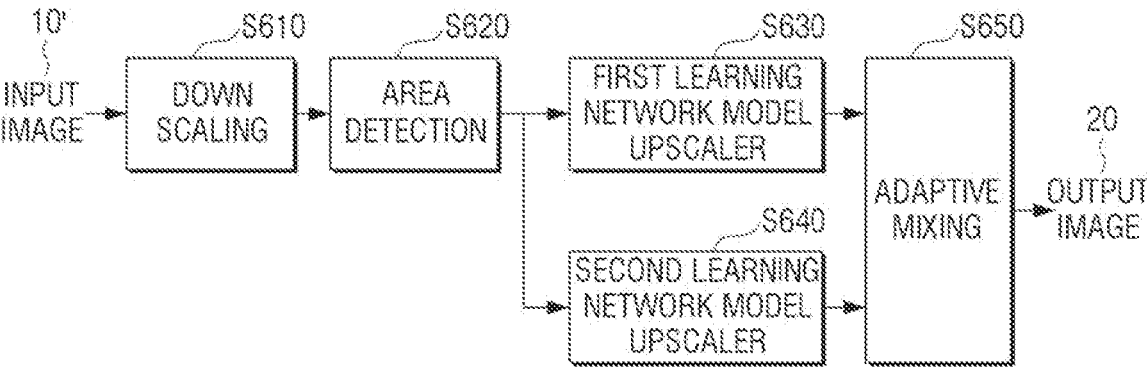
FIG. 6 is a diagram illustrating first and second learning network models according to another embodiment of the disclosure.

FIG. 6 is a diagram illustrating first and second learning network models according to an embodiment of the disclosure.

The processor 120 according to an embodiment of the disclosure may downscale the input image 10' and acquire an image 10 of a relatively lower resolution at operation S610, and acquire area detection information by which edge areas and texture areas have been identified based on the downscaled image 10' at operation S620. According to the embodiment illustrated in FIG. 5, the processor 120 may identify edge areas and texture areas included in the input image 10' of the resolution of the original image. Referring to FIG. 6, the processor 120 may identify edge areas and texture areas included in the image 10 in which the resolution of the input image 10' has been downscaled to the target resolution.

Then, the processor 120 according to an embodiment of the disclosure may provide area detection information and the image 10 respectively to the first and second learning network models.

The first learning network model according to an embodiment of the disclosure may perform upscaling of reinforcing only the edge areas of the image 10 based on area detection information at operation S630. The second learning network model may perform upscaling of reinforcing only the texture areas of the image 10 based on area detection information at operation S640.

As another example, the processor 120 may provide an image including only some of pixel information included in the image 10 to a learning network model based on area detection information. As the processor 120 provides only some information included in the image 10, but not the image 10, to a learning network model, the amount of operations by the learning network model may decrease. For example, the processor 120 may provide an image including only pixel information corresponding to the edge areas to the first learning network model, and provide an image including only pixel information corresponding to the texture areas to the second learning network model based on area detection information.

Then, the first learning network model may upscale the edge areas and acquire the first image, and the second learning network model may upscale the texture areas and acquire the second image.

Next, the processor 120 may add the first and second images to the input image 10' and acquire an output image 20 at operation S650.

Figure 7:
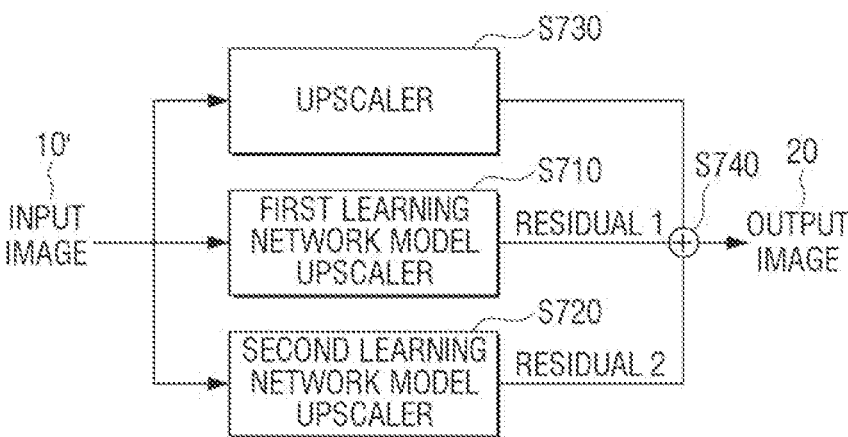
FIG. 7 is a diagram illustrating first and second learning network models according to another embodiment of the disclosure.

FIG. 7 is a diagram illustrating first and second learning network models according to another embodiment of the disclosure.

Referring to FIG. 7, the processor 120 according to an embodiment of the disclosure may apply the input image 10' as input to the first learning network model and acquire a first image at operation S710. As an example, the processor 120 may acquire a first image of a high resolution, as the first learning network model performs upscaling of reinforcing high frequency components corresponding to the edges included in the input image 10' at operation S710. Here, the first image may be a residual image. A residual image may be an image including only residual information other than the original image. The residual information may indicate a difference between each pixel or group of pixels of the original image and the high resolution image.

Also, the processor 120 according to an embodiment of the disclosure may apply the input image 10' as input to the second learning network model and acquire a second image at operation S720. As an example, the processor 120 may acquire a second image of a high resolution, as the second learning network model performs upscaling of reinforcing high frequency components corresponding to the texture included in the input image 10'. Here, the second image may be a residual image. The residual information may indicate a difference between each pixel or group of pixels of the original image and the high resolution image.

According to an embodiment of the disclosure, the first and second learning network models respectively perform upscaling of reinforcing at least one characteristic among the characteristics of the input image 10', and thus the first and second images are of high resolutions compared to the input image 10'. For example, if the resolution of the input image 10' is 2K, the resolutions of the first and second images may be 4K, and if the resolution of the input image 10' is 4K, the resolutions of the first and second images may be 8K.

The processor 120 according to an embodiment of the disclosure may upscale the input image 10' and acquire a third image at operation S730. According to an embodiment of the disclosure, the image processing apparatus 100 may include a separate processor upscaling the input image 10', and the processor 120 may upscale the input image 10' and acquire a third image of a high resolution. For example, the processor 120 may perform upscaling on the input image 10' by using bilinear interpolation, bicubic interpolation, cubic spline interpolation, Lanczos interpolation, edge directed interpolation (EDI), etc. Meanwhile, this is merely an example, and the processor 120 may upscale the input image 10' based on various upscaling (or, super-resolution) methods.

As another example, the processor 120 may apply the input image 10' as input to a third learning network model and acquire a third image of a high resolution corresponding to the input image 10'. Here, the third learning network model may be a deep learning based model or a machine learning based model. According to an embodiment of the disclosure, if the resolution of the input image 10' is 4K, the resolution of the third image may be 8K. Also, according to an embodiment of the disclosure, the resolutions of the first to third images may be identical.

Then, the processor 120 may mix the first to third images and acquire an output image 20 at operation S740.

The processor 120 according to an embodiment of the disclosure may mix a first residual image, which upscaled the input image 10' by reinforcing the edges in the input image 10', a second residual image, which upscaled the input image 10' by reinforcing the texture in the input image 10', and a third residual image which upscaled the input image 10', and acquire an output image. Here, the processor 120 may identify edge areas in the input image 10' and apply the identified edge areas to the first learning network model, and reinforce the edge areas, and thereby acquire an upscaled first residual image. Also, the processor 120 may identify texture areas in the input image 10' and apply the identified texture areas to the second learning network model, and reinforce the texture areas, and thereby acquire an upscaled second residual image. Meanwhile, this is merely an example, and the configurations and operations are not limited thereto. For example, the processor 120 may apply the input image 10' to the first and second learning network models. Then, the first learning network model may identify edge areas based on edge characteristics among the various image characteristics of the input image 10', and reinforce the identified edge areas, and thereby acquire an upscaled first residual image of a high resolution. The second learning network model may identify texture areas based on texture characteristics among the various image characteristics of the input image 10', and reinforce the identified texture areas, and thereby acquire an upscaled second residual image of a high resolution.

Also, the processor 120 according to an embodiment of the disclosure may upscale the input image 10' and acquire a third image of a high resolution. Here, the third image may be an image acquired by upscaling the original image, but not a residual image.

According to an embodiment of the disclosure, the processor 120 may mix the first to third images, and acquire an output image 20 of a resolution greater than the input image 10'. Here, the output image 20 may be an upscaled image in which edge areas and texture areas have been reinforced, but not an image in which only the resolution has been upscaled. Meanwhile, this is merely an example, and the processor 120 may acquire a plurality of residual images in which various image characteristics of the input image 10' have been reinforced, and mix the third image, which upscaled the input image 10', and the plurality of residual images, and acquire an output image 20 based on a result of mixing the images.

Figure 8:
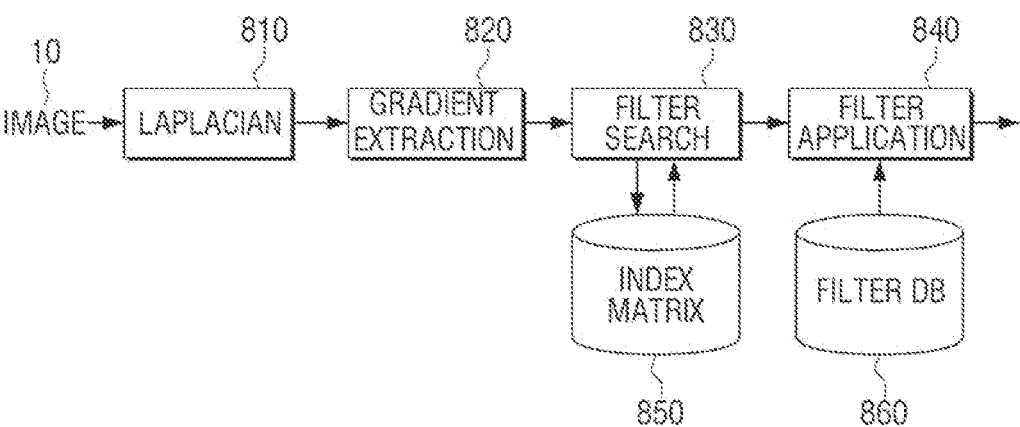
FIG. 8 is a diagram schematically illustrating an operation of a second learning network model according to an embodiment of the disclosure.

FIG. 8 is a diagram schematically illustrating an operation of a second learning network model according to an embodiment of the disclosure.

The processor 120 according to an embodiment of the disclosure may apply the image 10 as input to a second learning network model and acquire a second image in which the texture has been enhanced.

The second learning network model according to an embodiment of the disclosure may store a plurality of filters corresponding to each of a plurality of image patterns. Here, the plurality of image patterns may be classified according to characteristics of image blocks. For example, a first image pattern may be an image pattern having a substantial quantity of lines in a horizontal direction, and a second image pattern may be an image pattern having a substantial quantity of lines in a rotating direction. The plurality of filters may be filters learned in advance through an artificial intelligence algorithm.

Also, the second learning network model according to an embodiment of the disclosure may read image blocks in predetermined sizes from the image 10. Here, the image blocks may be a group of a plurality of pixels including a subject pixel and a plurality of surrounding pixels included in the image 10. As an example, the second learning network model may read a first image block in a 3×3 pixel size on the left upper end of the image 10, and perform image processing on the first image block. Then, the second learning network model may scan to the right by as much as the unit pixel from the left upper end of the image 10 and read a second image block in a 3×3 pixel size, and perform image processing on the second image block. By scanning across pixel blocks, the second learning network model may perform image processing on the image 10. Meanwhile, the second learning network model may read first to nth image blocks from the image 10 by itself, and the processor 120 may sequentially apply the first to nth image blocks as inputs to the second learning network model and perform image processing on the image 10.

For detecting high frequency components in an image block, the second learning network model may apply a filter in a predetermined size to the image block. As an example, the second learning network model may apply a Laplacian filter 810 in a 3×3 size corresponding to the size of the image block, to the image block, and thereby eliminate low frequency components in the image 10 and detect high frequency components. As another example, the second learning network model may acquire high frequency components of the image 10 by applying various types of filters such as Sobel, Prewitt, Robert, Canny, etc. to the image block.

Then, the second learning network model may calculate a gradient vector 820 based on high frequency components acquired from the image block. In particular, the second learning network model may calculate a horizontal gradient and a vertical gradient, and calculate a gradient vector based on the horizontal gradient and the vertical gradient. Here, a gradient vector may express an amount of change with respect to a pixel located in a predetermined direction based on each pixel. Also, the second learning network model may classify the image block as one of a plurality of image patterns based on the directivity of the gradient vector.

Next, the second learning network model may search for a filter (perform a filter search) 830 to be applied to the high frequency components detected from the image 10 by using an index matrix 850. Specifically, the second learning network model may identify index information indicating the pattern of the image block based on the index matrix, and search 830 for a filter corresponding to the index information. For example, if index information corresponding to the image block is identified as 32 among index information of 1 to 32 indicating the pattern of the image block, the second learning network model may acquire a filter mapped to index information 32 from among the plurality of filters. Meanwhile, the specific index value above is merely an example, and index information may decrease or increase according to the number of filters. Also, index information can be expressed in various ways other than integers.

Afterwards, the second learning network model may acquire at least one filter among the plurality of filters included in a filter database (DB) 860 based on the search result, and apply 840 the at least one filter to the image block, to thereby acquire a second image. As an example, the second learning network model may identify a filter corresponding to the pattern of the image block among the plurality of filters based on the search result, and apply the identified filter to the image block, to thereby acquire a second image in which texture areas have been upscaled.

Here, filters included in the filter database 860 may be acquired according to a result of learning the relation between an image block of a low resolution and an image block of a high resolution through an artificial intelligence algorithm. For example, the second learning network model may learn the relation between the first image block of a low resolution and the second image block of a high resolution in which the texture areas of the first image block have been upscaled through an artificial intelligence algorithm and identify a filter to be applied to the first image block, and store the identified filter in the filter database 860. However, this is merely an example, and the disclosure is not limited thereto. For example, the second learning network model may identify a filter reinforcing at least one of various characteristics of an image block through a result of learning using an artificial intelligence algorithm, and store the identified filter in the filter database 860.

Figure 9:
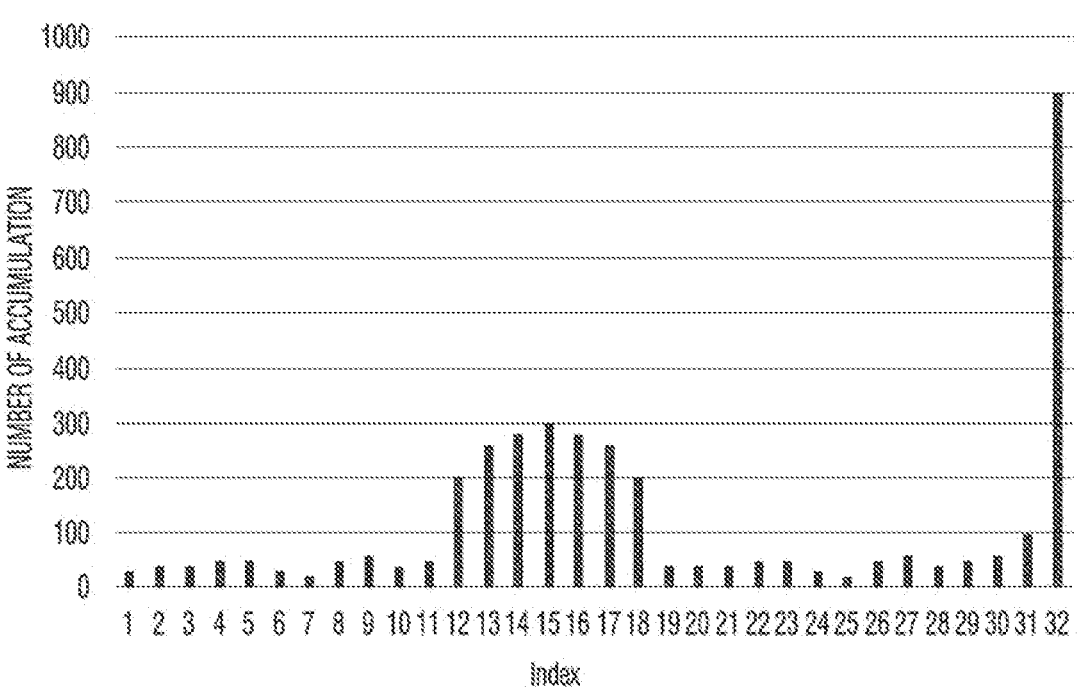
FIG. 9 is a diagram illustrating index information according to an embodiment of the disclosure.

FIG. 9 is a diagram illustrating index information according to an embodiment of the disclosure.

The processor 120 according to an embodiment of the disclosure may accumulate index information of image patterns corresponding to each image block classified, and acquire an accumulation result. Referring to FIG. 9, the processor 120 may acquire index information corresponding to the image pattern of an image block among index information indicating image patterns. Then, the processor 120 may accumulate index information of each of the plurality of image blocks included in the image 10, and thereby acquire an accumulation result, as illustrated in FIG. 9.

The processor 120 may analyze the accumulation result and identify the image 10 as one of a nature image or a graphic image. For example, if the number of image blocks not including patterns (or, not showing directivity) among the image blocks included in the image 10 is equal to or greater than a threshold value, based on the accumulation result, the processor 120 may identify the image 10 as a graphic image. As another example, if the number of image blocks not including patterns among the image blocks included in the image 10 is smaller than a threshold value, based on the accumulation result, the processor 120 may identity the image 10 as a nature image. As still another example, if the number of image blocks having patterns in a vertical direction or patterns in a horizontal direction is equal to or greater than a threshold value, based on the accumulation result, the processor 120 may identify the image 10 as a nature image. Meanwhile, the identifications and classifications of images are merely exemplary, and a threshold value may be assigned according to the purpose of the manufacturer, the setting of a user, etc.

As another example, the processor 120 may calculate the number and proportion of specific index information based on the accumulation result, and identify a type of the image 10 as a nature image or a graphic image based on the accumulation result. For example, the processor 120 may calculate at least three features based on the accumulation result.

If specific index information among index information is information indicating an image block of which pattern is not identified (or, which does not show directivity), the processor 120 may calculate the proportion of the index information from the accumulation result. Hereinafter, an image block of which pattern is not identified will be generally referred to as an image block including a flat area. The proportion of image blocks including a flat area among the entire image blocks can be calculated based on Formula 3 below.

$$P1 = 100 * \left( \frac{\mathrm{Histogram}[32]}{\sum_{i=1}^{32}\mathrm{Histogram}[i]} \right) \qquad \text{[Formula 3]}$$

Here, Histogram[i] means the number of image blocks having index information 'i' identified based on the accumulation result. Also, Histogram[32] means the number of image blocks having index information 32, based on the assumption that index information indicating image blocks including a flat area is 32, and P1 means the proportion of image blocks including a flat area among the entire image blocks.

If an image block includes a pattern, the processor 120 may identify whether the pattern is located in the center area inside the image block based on index information. As an example, the patterns of image blocks of which index information is 13 to 16 may be located in the center areas inside the blocks compared to image blocks of which index information is 1 to 12 and 17 to 31. Hereinafter, an image block of which image pattern is located in the center area inside the image block will be generally referred to as a center-distributed image block. Then, the processor 120 may calculate the proportion of center-distributed image blocks based on Formula 4 below, based on the accumulation result.

$$P2 = 100 * \left( \frac{\sum_{j=13}^{15}\mathrm{Histogram}[j]}{\sum_{i=1}^{32}\mathrm{Histogram}[i]} \right) \qquad \text{[Formula 4]}$$

Here, the processor 120 may calculate the number of image blocks having index information 1 to 31

$$\left( \sum_{i=1}^{32}\mathrm{Histogram}\,[i] \right)$$

to identify the number of image blocks including a pattern, excluding image blocks including a flat area. Also, the processor 120 may calculate the number of center-distributed image blocks $$\left( \sum_{j=13}^{15}\mathrm{Histogram}\,[j] \right).$$

Meanwhile, image blocks having index information 13 to 15 are merely an example of a case in which a pattern is located in the center area inside an image block, and the disclosure is not necessarily limited thereto. As another example, P2 may be calculated based on the number of index information 11 to 17.

Then, the processor 120 may acquire average index information of the image 10 based on index information of each of a plurality of image blocks included in the image 10. According to an embodiment of the disclosure, the processor 120 may calculate the average index information based on Formula 5 below.

$$P3 = 100 * \left( \frac{\sum_{i=1}^{32} i * \mathrm{Histogram}[i]}{\sum_{i=1}^{32}\mathrm{Histogram}[i]} \right) \qquad \text{[Formula 5]}$$

Here, 'i' means index information, Histogram[i] means the number of image blocks corresponding to the index information i, and P3 means the average index information.

The processor 120 according to an embodiment of the disclosure can calculate a 'Y' value based on Formula 6 below.

$$Y = W1*P1 + W2*P2 + W3*P3 + \mathrm{Bias} \qquad \text{[Formula 6]}$$

Here, P1 means the proportion of image blocks including a flat area, P2 means the proportion of center-distributed image blocks, and P3 means the average index information. Also, W1, W2, W3, and Bias mean parameters learned in advance by using an artificial intelligence algorithm model.

If the Y value exceeds 0, the processor 120 according to an embodiment of the disclosure may identify the image 10 as a graphic image, and if the 'Y' value is equal to or less than 0, the processor 120 may identify the image 10 as a nature image.

Then, the processor 120 may adjust the first and second weights corresponding respectively to the first image and the second image based on the identification result. As an example, if the image 10 is identified as a nature image, the processor 120 may increase at least one of the first weight corresponding to the first image or the second weight corresponding to the second image. Also, the processor 120 may increase at least one of the parameter 'a' or 'b' in Formulae 1 and 2. Meanwhile, if the image 10 is a nature image, the processor 120 may acquire an image of a high resolution of which clarity has been improved as the first image in which edges have been improved or the second image wherein texture has been improved is added to the image 10 or the input image 10', and thus the processor 120 may increase at least one of the first or second weight.

As another example, if the image 10 is identified as a graphic image, the processor 120 may decrease at least one of the first weight corresponding to the first image or the second weight corresponding to the second image. Also, the processor 120 may decrease at least one of the parameter 'a' or 'b' in Formulae 1 and 2. Meanwhile, if the image 10 is a graphic image, the processor 120 may acquire an image in which distortion occurred as the first image in which edges have been enhanced or the second image wherein texture has been enhanced is added to the image 10 or the input image 10', and thus the processor 120 may decrease at least one of the first or second weight and thereby minimize occurrence of distortion.

Here, a graphic image may be an image which manipulated an image of the actual world or an image newly created by using a computer, an imaging apparatus, etc. For example, a graphic image may include an illustrated image, a computer graphic (CG) image, an animation image, etc. generated by using known software. A nature image may be remaining images other than a graphic image. For example, a nature image may include an image of the actual world photographed by a photographing apparatus, a landscape image, a portrait image, etc.

Figure 10:
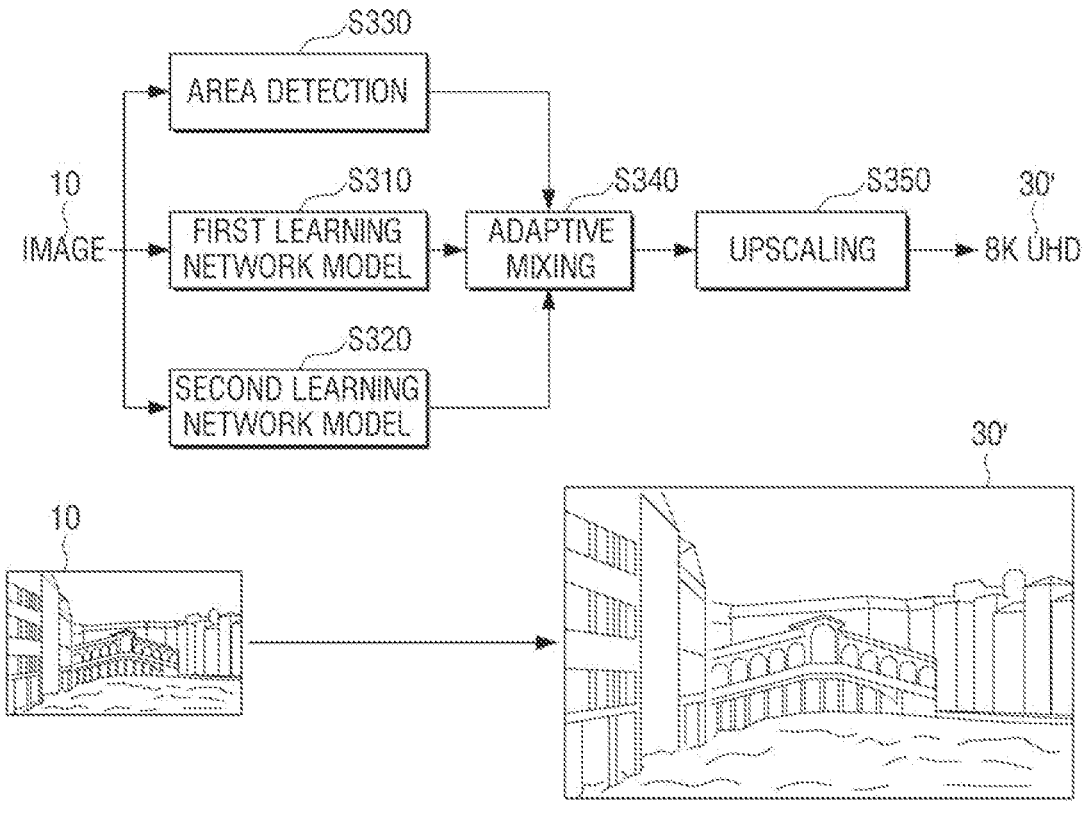
FIG. 10 is a diagram illustrating a method of acquiring a final output image according to an embodiment of the disclosure.

FIG. 10 is a diagram illustrating a method of acquiring a final output image according to an embodiment of the disclosure.

According to an embodiment of the disclosure, in case a final output image 30', i.e., a displayed image is an image having a resolution greater than that of an output image 30, the processor 120 may upscale the output image 30 and acquire the final output image 30' at operation S350. For example, if the output image 30 is a UHD image of 4K, and the final output image is an image of 8K, the processor 120 may upscale the output image 30 to a UHD image of 8K, and acquire the final output image 30'. Meanwhile, according to another embodiment of the disclosure, a separate processor performing upscaling of the output image 30 may be provided in the image processing apparatus 100. For example, the image processing apparatus 100 may include first and second processors, and acquire the output image 30 in which edges and texture have been reinforced by using the first processor, and acquire the final output image 30' of a high resolution which enlarged the resolution of the output image 30 by using the second processor.

Meanwhile, each of the first and second learning network models according to various embodiments of the disclosure may be an on-device machine learning model in which an image processing apparatus 100 performs learning by itself, without being dependent on an external apparatus. Meanwhile, this is merely an example, and some learning network models may be implemented in the form of operating based on an on-device, and other learning network models may be implemented in the form of operating based on an external server.

Figure 11:
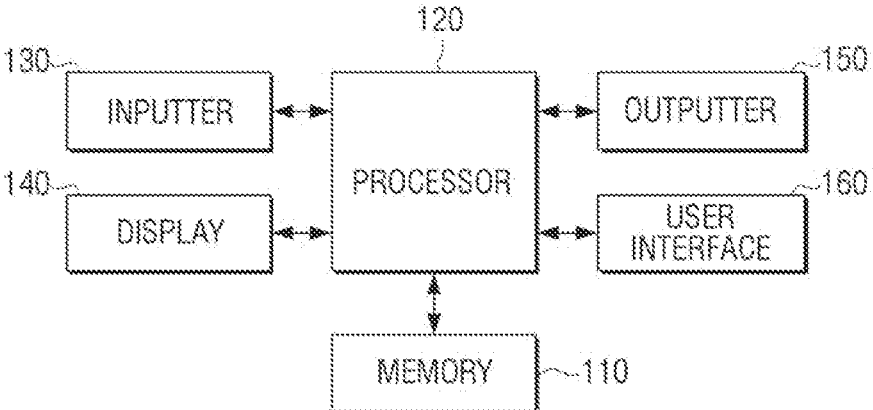
FIG. 11 is a block diagram illustrating a detailed configuration of the image processing apparatus illustrated in FIG. 2.

FIG. 11 is a block diagram illustrating a detailed configuration of the image processing apparatus illustrated in FIG. 2.

According to FIG. 11, the image processing apparatus 100 includes a memory 110, a processor 120, an inputter 130, a display 140, an outputter 150, and a user interface 160. Meanwhile, in explaining the components illustrated in FIG. 11, redundant explanation will be omitted for components that are similar to the components illustrated in FIG. 2.

According to an embodiment of the disclosure, the memory 110 may be implemented as a single memory storing data generated from various operations according to the disclosure.

The memory 110 may be implemented to include first to third memories.

The first memory may store at least a part of an image input through the inputter 130. In particular, the first memory may store at least some areas of an input image frame. In this configuration, at least some areas may be areas necessary for performing image processing according to an embodiment of the disclosure. Meanwhile, according to an embodiment of the disclosure, the first memory may be implemented as an N line memory. For example, an N line memory may be a memory having capacity as much as 17 lines in a horizontal direction, but the memory is not limited thereto. For example, in case a full HD image of 1080p (a resolution of 1,920 chines) is input, only image areas of 17 lines in the full HD image are stored in the first memory. The reason that the first memory is implemented as an N line memory, and only some areas of an input image frame are stored for image processing, as described above, is that the memory capacity of the first memory is restrictive according to limitation in terms of hardware. Meanwhile, the second memory may be a memory area allotted to a learning network model among the entire areas of the memory 110.

The third memory is a memory in which the first and second images, and the output image are stored, and according to various embodiments of the disclosure, the third memory may be implemented as memories in various sizes. According to an embodiment of the disclosure, the processor 120 applies an image 10 which downscaled an input image 10' to the first and second learning network models, and thus the size of the third memory storing the first and second images acquired from the first and second learning network models may be implemented as an identical or similar size to that of the first memory.

The inputter 130 may be a communication interface such as a wired Ethernet interface or a wireless communication interface that receives content of various types, for example, image signals from an image source. For example, the inputter 130 may receive image signals by a streaming or downloading method over one or more networks such as the Internet from an external apparatus (e.g., a source apparatus), an external storage medium (e.g., a USB), an external server (e.g., a webhard), etc. through communication methods such as Wi-Fi based on AP (a Wireless LAN network), Bluetooth, Zigbee, a wired/wireless Local Area Network (LAN), a WAN, Ethernet, LTE, 5th-generation (5G), IEEE 1394, a High Definition Multimedia Interface (HDMI), a Mobile High-Definition Link (MHL), a Universal Serial Bus (USB), a Display Port (DP), Thunderbolt, a Video Graphics Array (VGA) port, an RGB port, a D-subminiature (D-SUB), a Digital Visual Interface (DVI), etc. In particular, a 5G communication system is communication using ultra high frequency (mmWave) bands (e.g., millimeter wave frequency bands such as 26, 28, 38, and 60 GHz bands), and the image processing apparatus 100 may transmit or receive UHD images of 4K and 8K in a streaming environment.

Here, an image signal may be a digital signal, but the image signal not limited thereto.

The display 140 may be implemented in various forms such as a liquid crystal display (LCD), an organic light-emitting diode (OLED), a light-emitting diode (ED), a Micro LED, quantum dot light-emitting diodes (QLEDs), liquid crystal on silicon (LCoS), digital light processing (DLP), and a quantum dot (QD) display panel. In particular, the processor 120 according to an embodiment of the disclosure may control the display 140 to display an output image 30 or a final output image 30'. Here, the final output image 30' may include a real time UHD image of 4K or 8K, a streaming image, etc.

The outputter 150 outputs acoustic signals.

For example, the outputter 150 may convert a digital acoustic signal processed at the processor 120 into an analogue acoustic signal and amplify the signal, and output the signal. For example, the outputter 150 may include at least one speaker unit, a D/A converter, an audio amplifier, etc. which may output at least one channel. According to an embodiment of the disclosure, the outputter 150 may be implemented to output various multi-channel acoustic signals. In this case, the processor 120 may control the outputter 150 to perform enhancement processing on an acoustic signal input to correspond to enhancement processing of an input image, and output the signal. For example, the processor 120 may convert an input two-channel acoustic signal into a virtual multi-channel (e.g., a 5.1 channel) acoustic signal, or recognize the location in which the image processing apparatus 100 is placed within an environment of a room or building and process the signal as a stereoscopic acoustic signal optimized for the space, or provide an acoustic signal optimized according to the type (e.g., the genre of the content) of an input image. Meanwhile, the user interface 160 may be implemented as an apparatus such as a button, a touch pad, a mouse, and a keyboard, or as a touch screen, a remote control receiver, etc. that can receive user input to perform both the aforementioned display function and a manipulation input function. The remote control transceiver may receive or transmit a remote control signal from and to an external remote control apparatus through at least one communication method among infrared communication, Bluetooth communication, or Wi-Fi communication. Meanwhile, although not illustrated in FIG. 9, free filtering of removing noise of an input image may be applied prior to image processing according to an embodiment of the disclosure. For example, eminent noise may be removed by applying a smoothing filter like a Gaussian filter, a guided filter filtering an input image by comparing the image to a predetermined guidance, etc.

Figure 12:
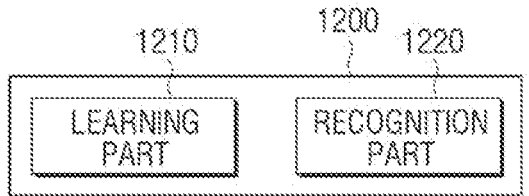
FIG. 12 is a block diagram illustrating a configuration of an image processing apparatus for learning and using a learning network model according to an embodiment of the disclosure.

FIG. 12 is a block diagram illustrating a configuration of an image processing apparatus for learning and using a learning network model according to an embodiment of the disclosure.

Referring to FIG. 12, the processor 1200 may include at least one of a learning part 1210 or a recognition part 1220. The processor 1200 in FIG. 12 may correspond to the processor 120 of the image processing apparatus 100 in FIG. 2 or a processor of a data learning server.

The processor 1200 of the image processing apparatus 100 for learning and using the first and second learning network models may include at least one of the learning part 1210 or the recognition part 1220.

The learning part 1210 according to an embodiment of the disclosure may acquire an image in which the image characteristics of the image 10 have been reinforced, and acquire an output image based on the image 10 and the image in which the image characteristics of the image 10 have been reinforced. Then, the learning part 1210 may generate or train a recognition model having a standard for minimizing distortion of the image 10 and acquiring an upscaled image of a high resolution corresponding to the image 10. Also, the learning part 1210 may generate a recognition model having a determination standard by using collected learning data.

As an example, the learning part 1210 may generate, train, or update a learning network model such that at least one of edge areas or texture areas of the output image 30 are enhanced more than those of the input image 10'.

The recognition part 1220 may use predetermined data (e.g., an input image) as input data of a trained recognition model, and thereby estimate a subject for recognition or a situation included in the predetermined data.

At least a part of the learning part 1210 and at least a part of the recognition part 1220 may be implemented as a software module or manufactured in the form of at least one hardware chip, and installed on an image processing apparatus. For example, at least one of the learning part 1210 or the recognition part 1220 may be manufactured in the form of a dedicated hardware chip for artificial intelligence (AI), or as a portion of a conventional generic-purpose processor (e.g.: a CPU or an application processor) or a graphic-dedicated processor (e.g.: a GPU), and installed on the aforementioned various types of image processing apparatuses or object recognition apparatuses. Here, a dedicated hardware chip for artificial intelligence is a dedicated processor specialized in probability operations, and has higher performance in parallel processing than conventional generic-purpose processors, and is capable of swiftly processing operations in the field of artificial intelligence like machine learning. In case the learning part 1210 and the recognition part 1220 are implemented as one or more software modules (or, a program module including instructions), the software module may be stored in a non-transitory computer readable medium. In this case, the software module may be provided by an operating system (OS), or by a specific application. Alternatively, a portion of the software module may be provided by an operating system (OS), and the other portions may be provided by a specific application.

In this case, the learning part 1210 and the recognition part 1220 may be installed on one image processing apparatus, or may respectively be installed on separate image processing apparatuses. For example, one of the learning part 1210 and the recognition part 1220 may be included in the image processing apparatus 100, and the other may be included in an external server. Also, the learning part 1210 and the recognition part 1220 may be connected by wire or wirelessly or may be separate software modules of a larger software module or application. Model information constructed by the learning part 1210 may be provided to the recognition part 1220, and data input to the recognition part 1220 may be provided to the learning part 1210 as additional learning data.

Figure 13:
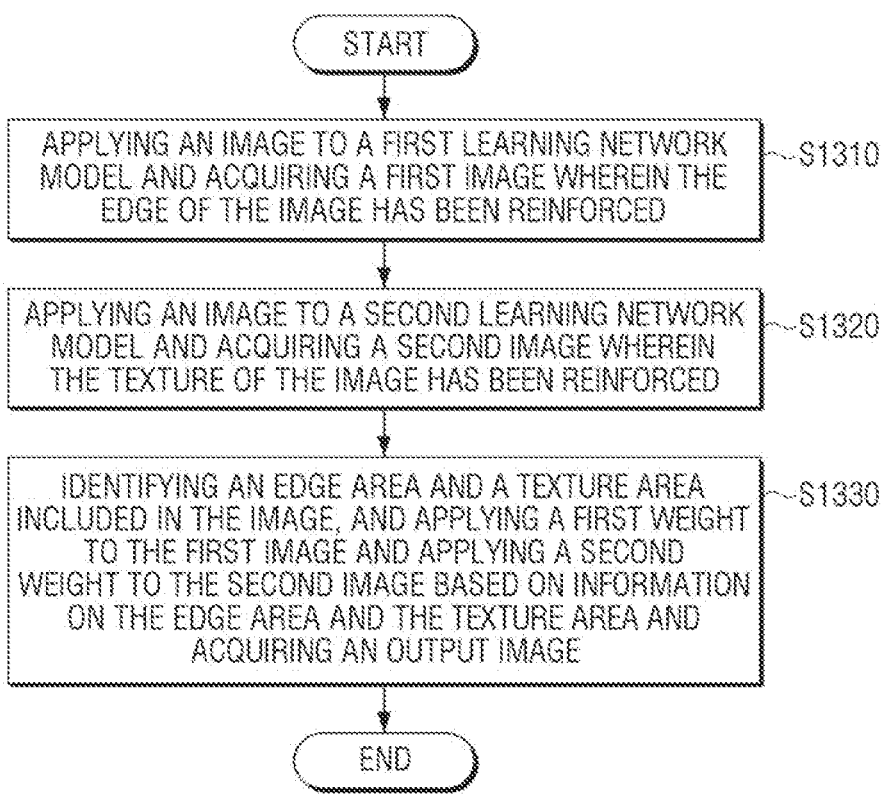
FIG. 13 is a flow chart illustrating an image processing method according to an embodiment of the disclosure.

FIG. 13 is a flow chart illustrating an image processing method according to an embodiment of the disclosure.

According to the image processing method illustrated in FIG. 13, first, an image is applied to the first learning network model, and a first image in which the edges of the image have been enhanced is acquired at operation S1310.

Then, the image is applied to the second learning network model, and a second image in which the texture of the image has been enhanced is acquired at operation S1320.

Next, edge areas and texture areas included in the image are identified, and a first weight is applied to the first image and a second weight is applied to the second image based on information on the edge areas and the texture areas, and an output image is acquired at operation S1330.

Here, the first learning network model and the second learning network model may be learning network models of types different from each other.

The first learning network model according to an embodiment of the disclosure may be one of a deep learning model learning to enhance the edges of the image by using a plurality of layers or a machine learning model trained to enhance the edges of the image by using a plurality of pre-learned filters.

Also, the second learning network model according to an embodiment of the disclosure may be one of a deep learning model learning to optimize the texture of the image by using a plurality of layers or a machine learning model trained to optimize the texture of the image by using a plurality of pre-learned filters.

Also, the operation S1330 of acquiring an output image may include the step of acquiring the first weight corresponding to the edge areas and the second weight corresponding to the texture areas based on proportion information of the edge areas and the texture areas.

In addition, an image processing method according to an embodiment of the disclosure may include the step of downscaling an input image and acquiring the image of a resolution less than the resolution of the input image. Meanwhile, the first learning network model may acquire the first image by performing upscaling reinforcing the edges of the image, and the second learning network model may acquire the second image by performing upscaling reinforcing the texture of the image.

Also, the image processing method according to an embodiment of the disclosure may include the steps of acquiring area detection information by which the edge areas and the texture areas have been identified based on the downscaled image and providing the area detection information and the image respectively to the first and second learning network models.

Here, the step of providing the area detection information and the image respectively to the first and second learning network models may include the steps of providing an image including only pixel information corresponding to the edge areas to the first learning network model based on the area detection information and providing an image including only pixel information corresponding to the texture areas to the second learning network model. Meanwhile, the first learning network model may acquire the first image by upscaling the edge areas, and the second learning network model may acquire the second image by upscaling the texture areas.

In addition, the first image and the second image according to an embodiment of the disclosure may be respectively a first residual image and a second residual image. Also, in the operation S1330 of acquiring an output image, the first weight may be applied to the first residual image, and the second weight may be applied to the second residual image, and then the residual images may be mixed with the image to acquire the output image.

Further, the second learning network model may be a model that stores a plurality of filters corresponding to each of a plurality of image patterns, and classifies each of image blocks included in the image into one of the plurality of image patterns, and applies at least one filter corresponding to classified image patterns among the plurality of filters to the image blocks and provides the second image.

In addition, the operation S1330 of acquiring an output image according to an embodiment of the disclosure may include the steps of accumulating index information of image patterns corresponding to each of the image blocks classified and identifying a type of the image, for example as one of a nature image or a graphic image, based on the accumulation result, and adjusting the weight based on the identification result.

Here, the step of adjusting the weight may include the step of, based on the image being identified as the nature image, increasing at least one of the first weight corresponding to the first image or the second weight corresponding to the second image, and based on the image being identified as the graphic image, decreasing at least one of the first weight or the second weight.

The output image may be an ultra high definition (UHD) image of 4K, and the image processing method according to an embodiment of the disclosure may include the step of upscaling the output image to a UHD image of 8K.

Meanwhile, the various embodiments of the disclosure may be applied to all electronic apparatuses that are capable of performing image processing such as an image receiving apparatus like a set top box and an image processing apparatus, etc., as well as an image processing apparatus.

Also, the various embodiments described so far may be implemented in a recording medium that can be read by a computer or an apparatus similar to a computer, by using software, hardware, or a combination thereof. In some cases, the embodiments described in this specification may be implemented as the processor 120 itself. According to implementation by software, the embodiments such as procedures and functions described in this specification may be implemented as separate software modules. Each of the software modules may perform one or more functions and operations described in this specification.

Meanwhile, computer instructions for performing processing operations of the acoustic outputting apparatus 100 according to the aforementioned various embodiments of the disclosure may be stored in a non-transitory computer readable medium. When computer-readable instructions stored in such a non-transitory computer readable medium are executed by the processor of a specific apparatus, processing operations at the acoustic outputting apparatus 100 according to the aforementioned various embodiments are performed by the specific apparatus.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

While embodiments of the disclosure have been illustrated and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An image processing apparatus comprising:
a memory storing at least one instruction; and
a processor configured to execute the at least one instruction stored in the memory to:
obtain a first image in which a first area is processed and a first image characteristic is enhanced in an input image by applying the input image to a first neural network model,
obtain a second image in which a second area is processed and a second image characteristic is enhanced in the input image by applying the input image to a second neural network model,
obtain a first weight corresponding to the first image and a second weight corresponding to the second image by applying the input image to a third neural network model, and
provide an output image by mixing the first and second images according to the first weight and the second weight,
wherein each of the first neural network model and the second neural network model is trained to enhance different characteristics of an image.

2. The image processing apparatus of claim 1, wherein the processor is further configured to identify a plurality of objects included in the input image,
wherein the first area corresponds to a first object among the plurality of objects, and
wherein the second area corresponds to a second object among the plurality of objects.

3. The image processing apparatus of claim 1, wherein the processor is further configured to:
identify the first area included in the input image,
obtain the first image in which the first image characteristic of the first area is enhanced in the input image by using the first neural network model,
identify the second area included in the input image,
obtain the second image in which the second image characteristic of the second area is enhanced in the input image by using the second neural network model, and
provide the output image by mixing the first image and the second image.

4. The image processing apparatus of claim 3, wherein the first image characteristic of the first area corresponds to a characteristic of a graphic image, and wherein the second image characteristic of the second area corresponds to a characteristic of a natural image.

5. The image processing apparatus of claim 1,
wherein the first weight corresponds to the first area by,
wherein the second weight corresponds to the second area, and
wherein the processor is further configured to:
    apply the first weight to the first image,
    apply the second weight to the second image, and
    mix the first image to which the first weight is applied and the second image to which the second weight is applied to provide the output image.

6. The image processing apparatus of claim 1, wherein the processor is further configured to:
    classify each of a plurality of image blocks constituting the input image into either a graphic image or a natural image,
    obtain the first image in which the first image characteristic of an image block classified as the graphic image from among the plurality of image blocks is enhanced as the first image by using the first neural network model, and
    obtain the second image in which the second image characteristic of an image block classified as the natural image from among the plurality of image blocks is enhanced as the second image by using the second neural network model.

7. The image processing apparatus of claim 6, wherein the graphic image includes any one of an illustration image, a computer graphic image, or an animation image, and
    wherein the natural image includes any one of a landscape image or a human image.

8. The image processing apparatus of claim 6, wherein the image block classified as the graphic image among the plurality of image blocks corresponds to the first area in the input image, and the image block classified as the natural image among the plurality of image blocks corresponds to the second area in the input image.

9. The image processing apparatus of claim 1, wherein the first neural network model and the second neural network model are different types of neural network models.

10. The image processing apparatus of claim 1, wherein the first neural network model is one of a deep learning model for enhancing the first image using a plurality of layers or a machine learning model trained to enhance the first image characteristic using a plurality of pre-learned filters, and
    wherein the second neural network model is one of a deep learning model for enhancing the second image characteristic using a plurality of layers or a machine learning model trained to enhance the second image characteristic using a plurality of pre-learned filters.

11. A method of controlling an image processing apparatus, the method comprising:
    obtaining a first image in which a first area is processed and a first image characteristic is enhanced in an input image by applying the input image to a first neural network model;
    obtaining a second image in which a second area is processed and a second image characteristic is enhanced in the input image by applying the input image to a second neural network model;
    obtaining a first weight corresponding to the first image and a second weight corresponding to the second image by applying the input image to a third neural network model, and providing an output image by mixing the first and second images according to the first weight and the second weight,
    wherein each of the first neural network model and the second neural network model is trained to enhance different characteristics of an image.

12. The method of claim 11, wherein the method further comprises:
    identifying a plurality of objects included in the input image,
    wherein the first area corresponds to a first object among the plurality of objects, and
    wherein the second area corresponds to a second object among the plurality of objects.

13. The method of claim 11, wherein the method further comprises:
    identifying the first area included in the input image;
    identifying the second area included in the input image,
    wherein the obtaining the first image comprises obtaining the first image in which a first characteristic of the first area is enhanced in the input image by using the first neural network model,
    wherein the obtaining the second image comprises obtaining the second image in which a second characteristic of the second area is enhanced in the input image by using the second neural network model, and
    wherein the providing the output image comprises providing the output image by mixing the first image and the second image.

14. The method of claim 13, wherein the first characteristic of the first area corresponds to a characteristic of a graphic image, and
    wherein the second characteristic of the second area corresponds to a characteristic of a natural image.

15. The method of claim 11,
wherein the first weight corresponds to the first area,
wherein the second weight corresponds to the second area,
wherein the method further comprises:
    applying the first weight to the first image;
    applying the second weight to the second image; and
    mixing the first image to which the first weight is applied and the second image to which the second weight is applied to provide the output image.

16. The method of claim 11, wherein the method further comprises:
    classifying each of a plurality of image blocks constituting the input image into either a graphic image or a natural image,
    wherein the obtaining comprises obtaining the first image in which the first image characteristic of an image block classified as the graphic image from among the plurality of image blocks is enhanced as the first image by using the first neural network model, and
    wherein the obtaining comprises obtaining the second image in which the second image characteristic of an image block classified as the natural image from among the plurality of image blocks is enhanced as the second image by using the second neural network model.

17. The method of claim 16, wherein the graphic image includes any one of an illustration image, a computer graphic image, or an animation image, and
    wherein the natural image includes any one of a landscape image or a human image.

18. The method of claim 16, wherein the image block classified as the graphic image among the plurality of image blocks corresponds to the first area in the input image, and the image block classified as the natural image among the plurality of image blocks corresponds to the second area in the input image.

19. The method of claim 11, wherein the first neural network model and the second neural network model are different types of neural network models.

20. The method of claim 11, wherein the first neural network model is one of a deep learning model for enhancing the first image characteristic using a plurality of layers or a machine learning model trained to enhance the first image characteristic using a plurality of pre-learned filters, and wherein the second neural network model is one of a deep learning model for enhancing the second image characteristic using a plurality of layers or a machine learning model trained to enhance the second image characteristic using a plurality of pre-learned filters.

* * * * *